(12) United States Patent
Hitotsuyanagi

(10) Patent No.: US 11,712,863 B2
(45) Date of Patent: Aug. 1, 2023

(54) METHOD FOR MANUFACTURING PNEUMATIC TIRE

(71) Applicant: Toyo Tire Corporation, Itami (JP)

(72) Inventor: Tomohiro Hitotsuyanagi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/552,922

(22) Filed: Dec. 16, 2021

(65) Prior Publication Data

US 2022/0203640 A1 Jun. 30, 2022

(30) Foreign Application Priority Data

Dec. 24, 2020 (JP) ................. 2020-214733

(51) Int. Cl.
*B29D 30/30* (2006.01)
*B29D 30/06* (2006.01)
*B60C 9/08* (2006.01)

(52) U.S. Cl.
CPC ......... *B29D 30/30* (2013.01); *B29D 30/0681* (2013.01); *B60C 9/08* (2013.01); *B29D 2030/0682* (2013.01)

(58) Field of Classification Search
CPC ...... B29D 2030/3064; B29D 2030/421; B29D 2030/423; B29D 2030/427; B29D 2030/428; B60C 2009/0408
USPC ........................................................ 156/134
See application file for complete search history.

(56) References Cited

U.S. PATENT DOCUMENTS

| | | | | |
|---|---|---|---|---|
| 5,437,751 A | * | 8/1995 | Hirano | ...................... B60C 9/04 156/134 |
| 2006/0243366 A1 | * | 11/2006 | Vialle | ................ B29D 30/3007 152/548 |
| 2012/0145301 A1 | * | 6/2012 | Kouno | ................ B29C 65/4815 152/151 |
| 2014/0174612 A1 | * | 6/2014 | Yoshikawa | ........... B60C 19/084 152/152.1 |

FOREIGN PATENT DOCUMENTS

JP 2000-198314 A 7/2000

* cited by examiner

*Primary Examiner* — Robert C Dye
*Assistant Examiner* — Alexander D Booth
(74) *Attorney, Agent, or Firm* — Whda, LLP

(57) ABSTRACT

A method for manufacturing a pneumatic tire includes: a step of winding carcass plies around a molding drum to mold a carcass, wherein the carcass has a joint portion in which ends of each of the carcass plies in a tire circumferential direction are overlapped with each other, the method further includes a step of pasting a rubber tape that covers at least a part of the joint portion after winding the carcass ply, and the rubber tape has: a central portion pasted to an outside of the joint portion and extending with a constant thickness along the tire circumferential direction; and tapered portions individually extending from both ends of the central portion in the tire circumferential direction along the tire circumferential direction while reducing a thickness of each of the tapered portions, and having tip ends with an angle of 45 degrees or less.

8 Claims, 7 Drawing Sheets

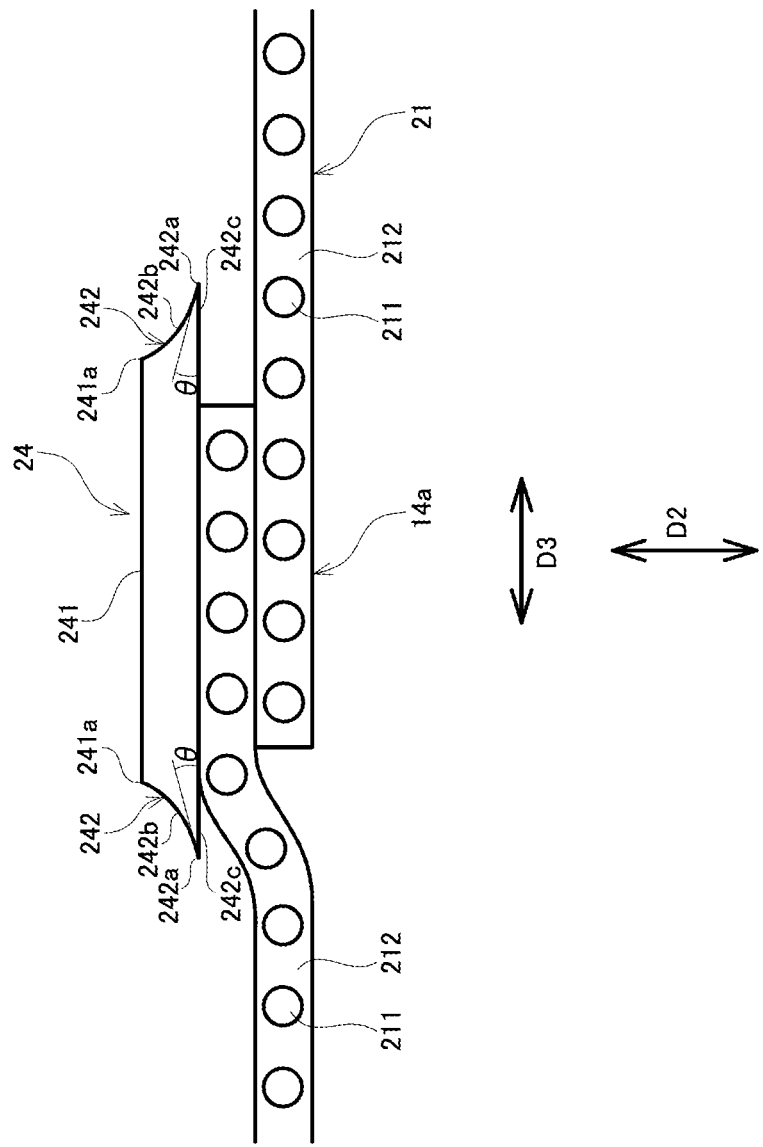

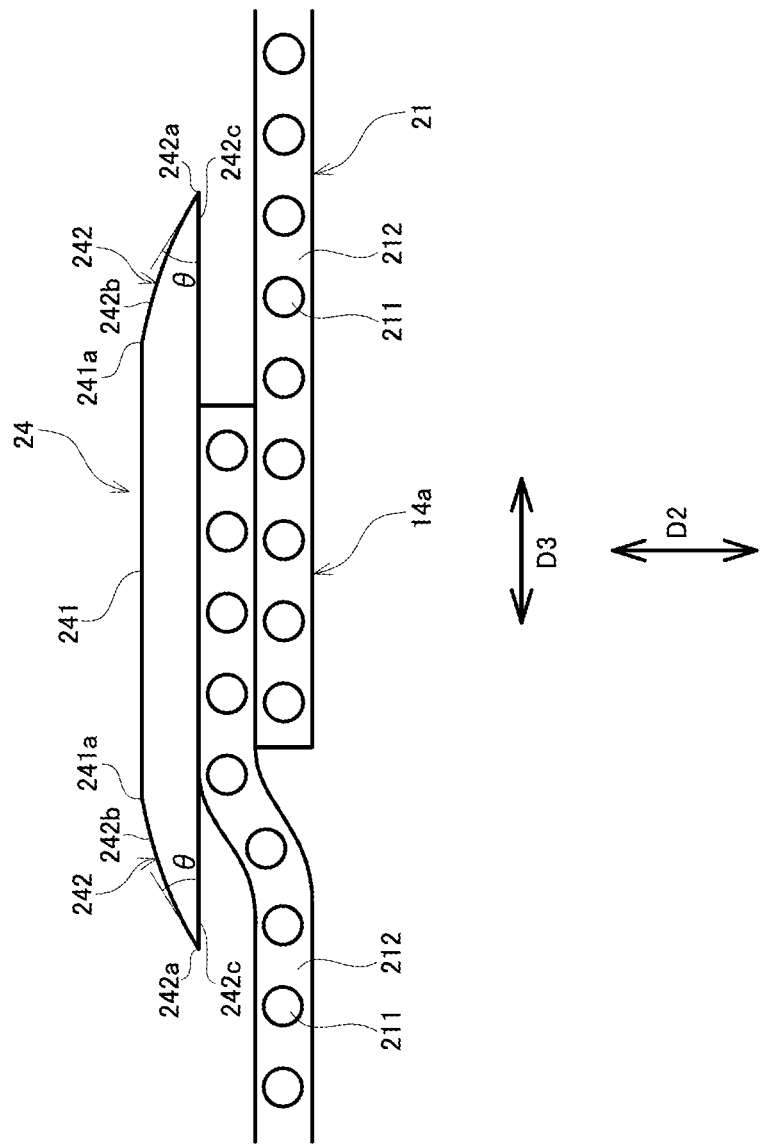

METHOD FOR MANUFACTURING PNEUMATIC TIRE

BACKGROUND OF THE INVENTION

Field of the Invention

The present disclosure relates to a method for manufacturing a pneumatic tire and the pneumatic tire.

Description of the Related Art

Heretofore, a carcass of a pneumatic tire has been formed by overlapping and joining ends of carcass plies in a tire circumferential direction with and to one another. Such a joint portion of each of the carcass plies has higher tensile stiffness than other portions. Therefore, when the carcass ply is deformed into a toroidal tire shape, the joint portion is more difficult to stretch than the other portions, and on a tire surface corresponding to the joint portion, a recess of the tire surface is likely to be generated. This recess remains even in the pneumatic tire that has already been vulcanized and molded.

Patent Document 1 listed below discloses a pneumatic tire in which a joint portion is covered with a rubber tape in order to eliminate a phenomenon of irregularities on sidewalls due to the joint portion of each of the carcass plies. The rubber tape can eliminate the recess that can be generated on the tire surface. However, since a cross-sectional shape of the rubber tape is substantially rectangular, projections may be generated conversely on the tire surface at ends of the rubber tape in the tire circumferential direction.

PRIOR ART DOCUMENT

Patent Document

Patent Document 1: JP-A-2000-198314

SUMMARY OF THE INVENTION

An object of the present disclosure is to provide a method for manufacturing a pneumatic tire, the method being capable of suppressing the recess from being generated on the tire surface due to the joint portion of each of the carcass plies, and a pneumatic tire.

A method for manufacturing a pneumatic tire according to the present disclosure is a method for manufacturing a pneumatic tire, the method including:

a step of winding carcass plies around a molding drum to mold a carcass, wherein the carcass has a joint portion in which ends of each of the carcass plies in a tire circumferential direction are overlapped with each other, the method further includes a step of pasting a rubber tape that covers at least a part of the joint portion after winding the carcass ply, and the rubber tape has: a central portion pasted to an outside of the joint portion and extending with a constant thickness along the tire circumferential direction; and tapered portions individually extending from both ends of the central portion in the tire circumferential direction along the tire circumferential direction while reducing a thickness of each of the tapered portions, and having tip ends with an angle of 45 degrees or less.

Further, a pneumatic tire of the present disclosure includes:

a carcass that reaches beads from a tread through sidewalls, wherein the carcass has: joint portions in each of which ends of each of carcass plies in a tire circumferential direction are overlapped with each other; and rubber tapes each of which covers at least a part of the joint portion, and each of the rubber tapes has: a central portion pasted to an outside of the joint portion and extending with a constant thickness along the tire circumferential direction; and tapered portions individually extending from both ends of the central portion in the tire circumferential direction along the tire circumferential direction while reducing a thickness of each of the tapered portions, and having tip ends with an angle of 45 degrees or less.

BRIEF DESCRIPTION OF THE DRAWINGS

FIG. 6 is an enlarged cross-sectional view of a main part of a joint portion of a carcass ply according to another embodiment; and FIG. 7 is an enlarged cross-sectional view of a main part of a joint portion of a carcass ply according to another embodiment.

DETAILED DESCRIPTION OF THE PREFERRED EMBODIMENTS

Figure 1:
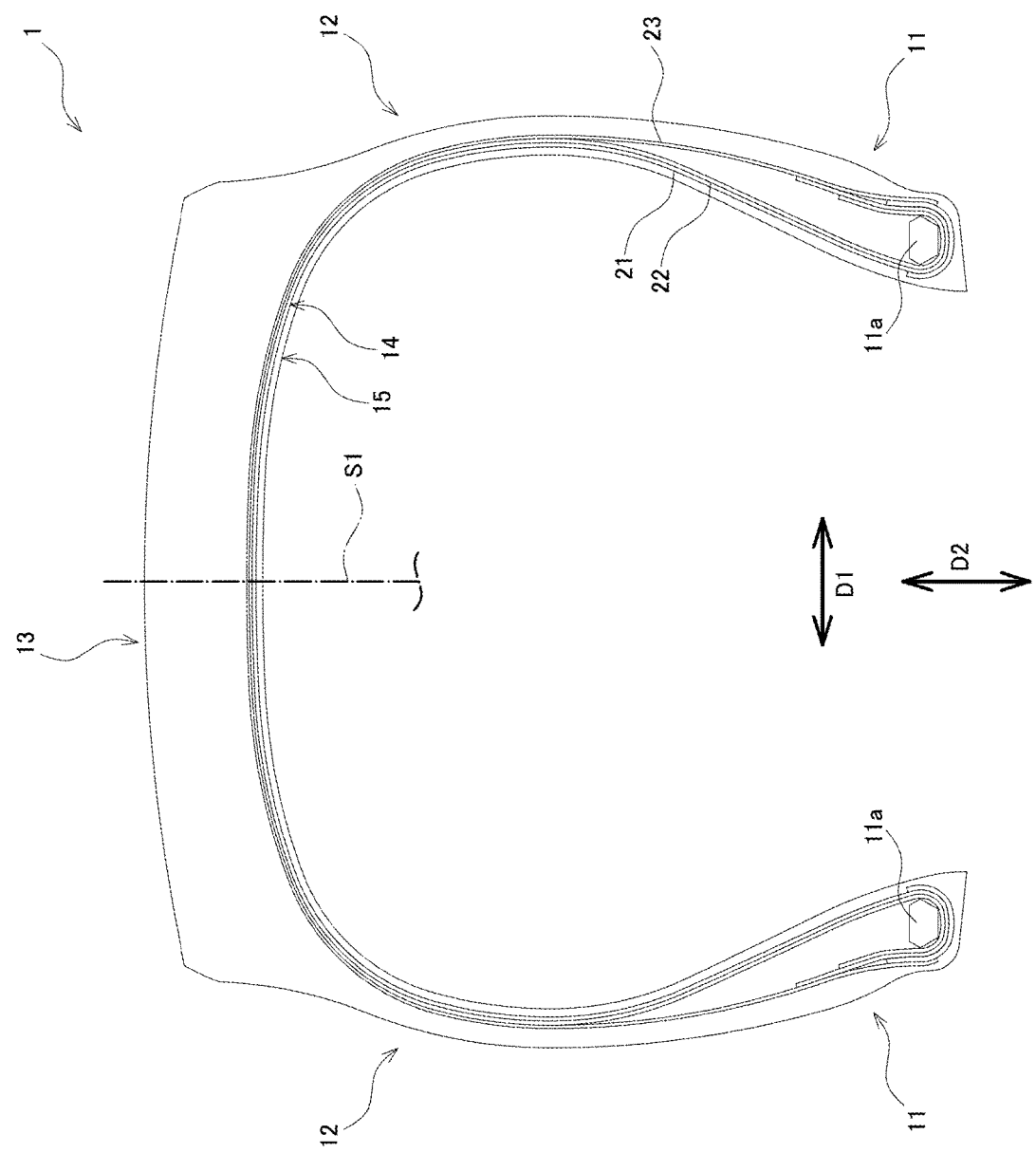
FIG. 1 is a cross-sectional view of a main part of a pneumatic tire according to a present embodiment on a tire meridian plane.

Hereinafter, an embodiment of a pneumatic tire and a method for manufacturing the same will be described with reference to FIGS. 1 to 5. Note that, in the respective drawings (also in FIGS. 6 and 7), dimensional ratios in the drawings and actual dimensional ratios do not necessarily coincide with each other, and moreover, dimensional ratios between the respective drawings do not necessarily coincide with one another.

<Configuration of Pneumatic Tire>

As illustrated in FIG. 1, a pneumatic tire 1 according to the present embodiment includes: a pair of beads 11 and 11 having bead cores 11a; a pair of sidewalls 12 and 12 extending outward in a tire radial direction D2 from the respective beads 11; and a tread 13 connected to outer ends of the pair of sidewalls 12 and 12 in the tire radial direction D2.

In each of the drawings, a tire axis direction D1 is a direction parallel to a tire rotation axis that is a rotation center of the pneumatic tire 1, a tire radial direction D2 is a diameter direction of the pneumatic tire 1, and a tire circumferential direction D3 is a direction around the tire rotation axis. Further, a tire equatorial plane S1 is a plane perpendicular to the tire rotation axis and located at the center of the pneumatic tire 1 in the tire axis direction D1, and a tire meridian plane is a plane including the tire rotation axis and perpendicular to the tire equatorial plane S1.

Note that, in the tire axis direction D1, an inner side refers to a side close to the tire equatorial plane S1, and an outer side refers to a side far from the tire equatorial plane S1.

Further, in the tire radial direction D2, an inner side refers to a side close to the tire rotation axis, and an outer side refers to a side far from the tire rotation axis.

The pneumatic tire 1 includes: a carcass 14 stretched between a pair of the bead cores 11a and 11a; and an inner liner 15 disposed inside the carcass 14 and having an excellent function to prevent permeation of gas in order to maintain the air pressure. The carcass 14 and the inner liner 15 are disposed along the tire inner circumference over the beads 11, the sidewalls 12, and the tread 13.

The carcass 14 is formed of three carcass plies 21, 22 and 23. In the tread 13, the carcass plies 21, 22 and 23 are stacked on one another in this order outward from the inner side in the tire radial direction D2. The first carcass ply 21 and the second carcass ply 22 are folded back around the bead cores 11a so as to catch the bead cores 11a thereinto. The third carcass ply 23 is terminated outside the bead cores 11a in the tire axis direction D1. The carcass 14 is formed by joining ends of the respective carcass plies 21, 22 and 23 in the tire circumferential direction D3 to one another.

Figure 2:
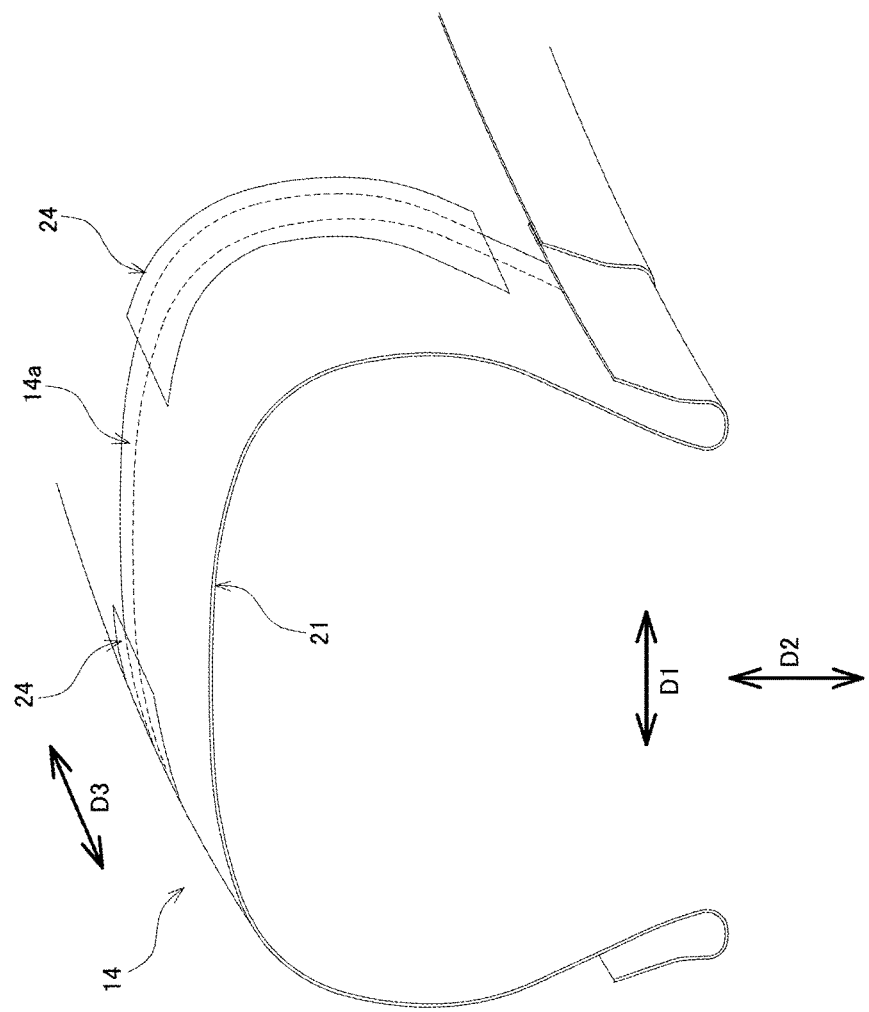
FIG. 2 is a perspective view of a first carcass ply.

FIG. 2 is a perspective view illustrating a part of the first carcass ply 21. The carcass 14 has a joint portion 14a in which the ends of the first carcass ply 21 in the tire circumferential direction D3 are overlapped with each other. Further, the carcass 14 has rubber tapes 24 (details will be described later) which cover the joint portion 14a.

The first carcass ply 21 includes: a plurality of carcass cords 211 (see FIG. 4) arrayed in parallel to one another in a direction substantially perpendicular to the tire circumferential direction D3; and topping rubber 212 (see FIG. 4) that coats the carcass cords 211.

In the joint portion 14a in which portions of the first carcass ply 21 are overlapped with each other, tensile stiffness is increased more than in a portion other than the joint portion 14a. Therefore, when the first carcass ply 21 that has a cylindrical shape is deformed into a toroidal shape as will be described later, the joint portion 14a is more difficult to stretch than the portion other than the joint portion 14a, and on a tire surface corresponding to the joint portion 14a, there is a problem that a recess of the tire surface is likely to be generated. The recess is conspicuous particularly on the sidewalls 12 with a thin rubber thickness. The rubber tapes 24 are arranged so as to cover the joint portion 14a, whereby an amount of rubber in the joint portion 14a is increased, and therefore, the recess can be suppressed from being generated on the tire surface.

<Method for Manufacturing Pneumatic Tire>

Next, referring to FIGS. 3 to 5, a method for manufacturing the pneumatic tire 1 will be described. A next method will be exemplified as a general method for manufacturing a pneumatic tire. First, tire constituent members including an inner liner, carcass plies, beads and the like are arranged at predetermined positions on a cylindrical molding drum, whereby a cylindrical case is molded, and this case is deformed into a toroidal shape, and the case is combined with tread rubber which are molded separately. Thus, an unvulcanized tire in an unvulcanized state is molded. Then, the unvulcanized tire is vulcanized and molded, whereby a pneumatic tire is manufactured.

Figure 3:
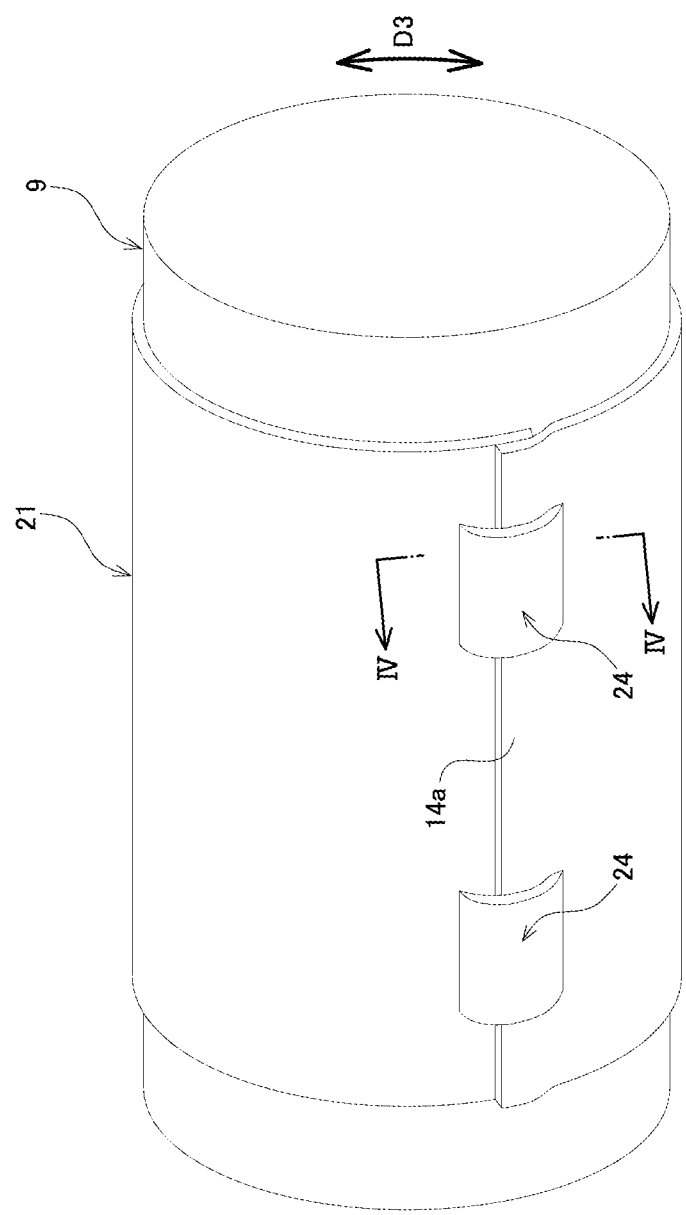
FIG. 3 is a perspective view illustrating a state where the first carcass ply is wound around a molding drum.

FIG. 3 illustrates a state where the first carcass ply 21 is wound around a molding drum 9. FIG. 4 is a cross-sectional view taken along a line IV-IV of FIG. 3. Note that, for convenience of the explanation, FIGS. 3 and 4 do not illustrate other members including the inner liner 15 and the like.

The ends of the first carcass ply 21 in the tire circumferential direction D3, the first carcass ply 21 being wound around the molding drum 9, are overlapped with each other, whereby the joint portion 14a is formed. As illustrated in FIG. 4, the first carcass ply 21 includes: the plurality of carcass cords 211 arrayed in parallel to one another in the direction substantially perpendicular to the tire circumferential direction D3; and the topping rubber 212 that coats the carcass cords 211. At the joint portion 14a, the carcass cords 211 are overlapped with each other.

After the first carcass ply 21 is wound around the molding drum 9, the rubber tapes 24 are pasted to the joint portion 14a so as to cover the same. Each of the rubber tapes 24 has a central portion 241 pasted to the outside of the joint portion 14a and extending with a constant thickness along the tire circumferential direction D3. The central portion 241 has a rectangular cross section. The central portion 241 completely covers the joint portion 14a. The rubber tapes 24 are pasted to the joint portion 14a so as to cover the same, whereby the recess generated in the joint portion 14a can be filled with the rubber tapes 24. Therefore, the recess can be suppressed from being generated on the tire surface by the joint portion 14a.

Further, each of the rubber tapes 24 has tapered portions 242 individually extending from both ends 241a and 241a of the central portion 241 in the tire circumferential direction D3 along the tire circumferential direction D3 while reducing a thickness of each thereof. The tapered portions 242 extend from both ends 241a and 241a of the central portion 241 in the tire circumferential direction D3 along the tire circumferential direction D3 while reducing the thickness of each thereof in a constant ratio. Outer side surfaces 242b of the tapered portions 242 in the tire radial direction D2 are flat surfaces. Further, inner side surfaces 242c of the tapered portions 242 in the tire radial direction D2 are flat surfaces, and extend continuously with an inner side surface of the central portion 241 in the tire radial direction D2. The tapered portions 242 have triangular cross sections. Each of the rubber tapes 24 has the tapered portions 242, whereby, on ends of the rubber tape 24 in the tire circumferential direction D3, the projection can be suppressed from being generated on the tire surface.

Figure 4:
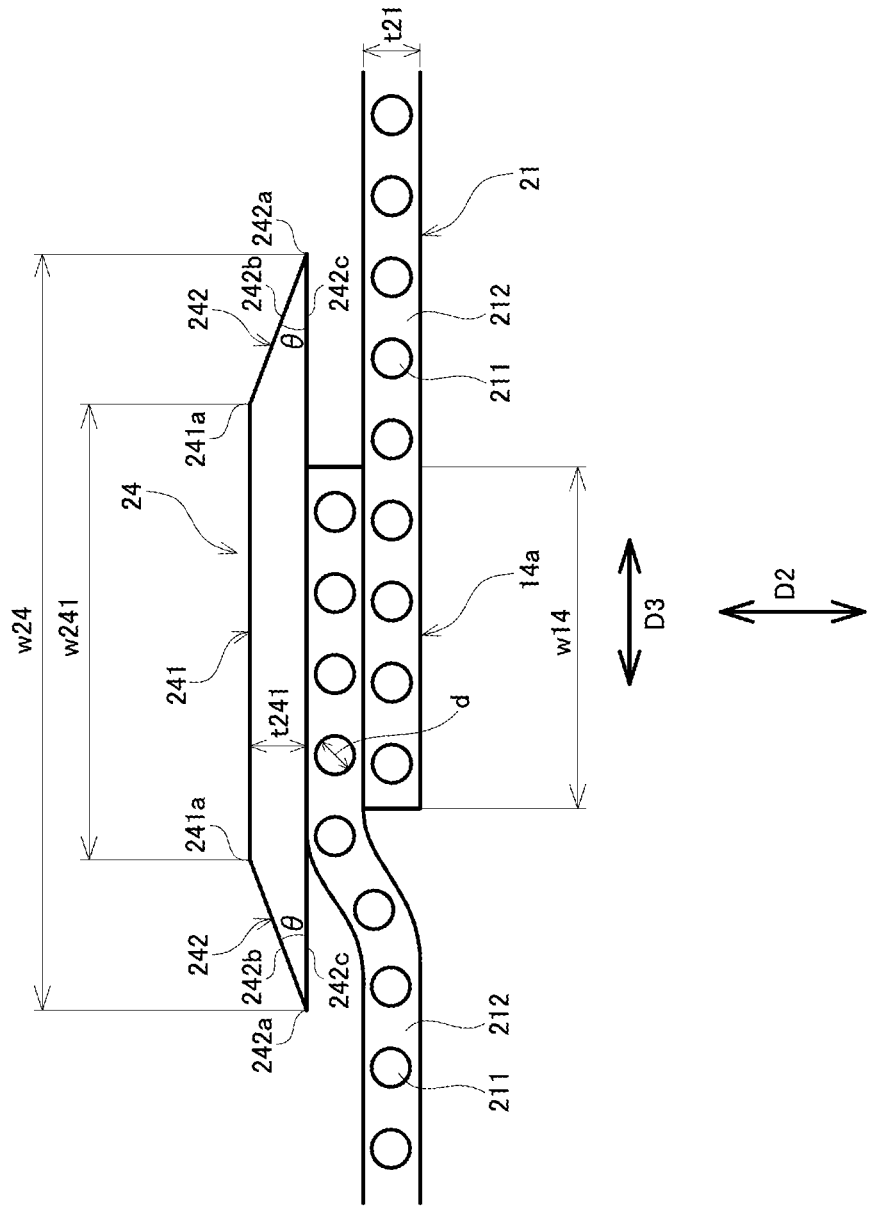
FIG. 4 is an enlarged cross-sectional view of a main part taken along a line IV-IV of FIG. 3.
Figure 5:
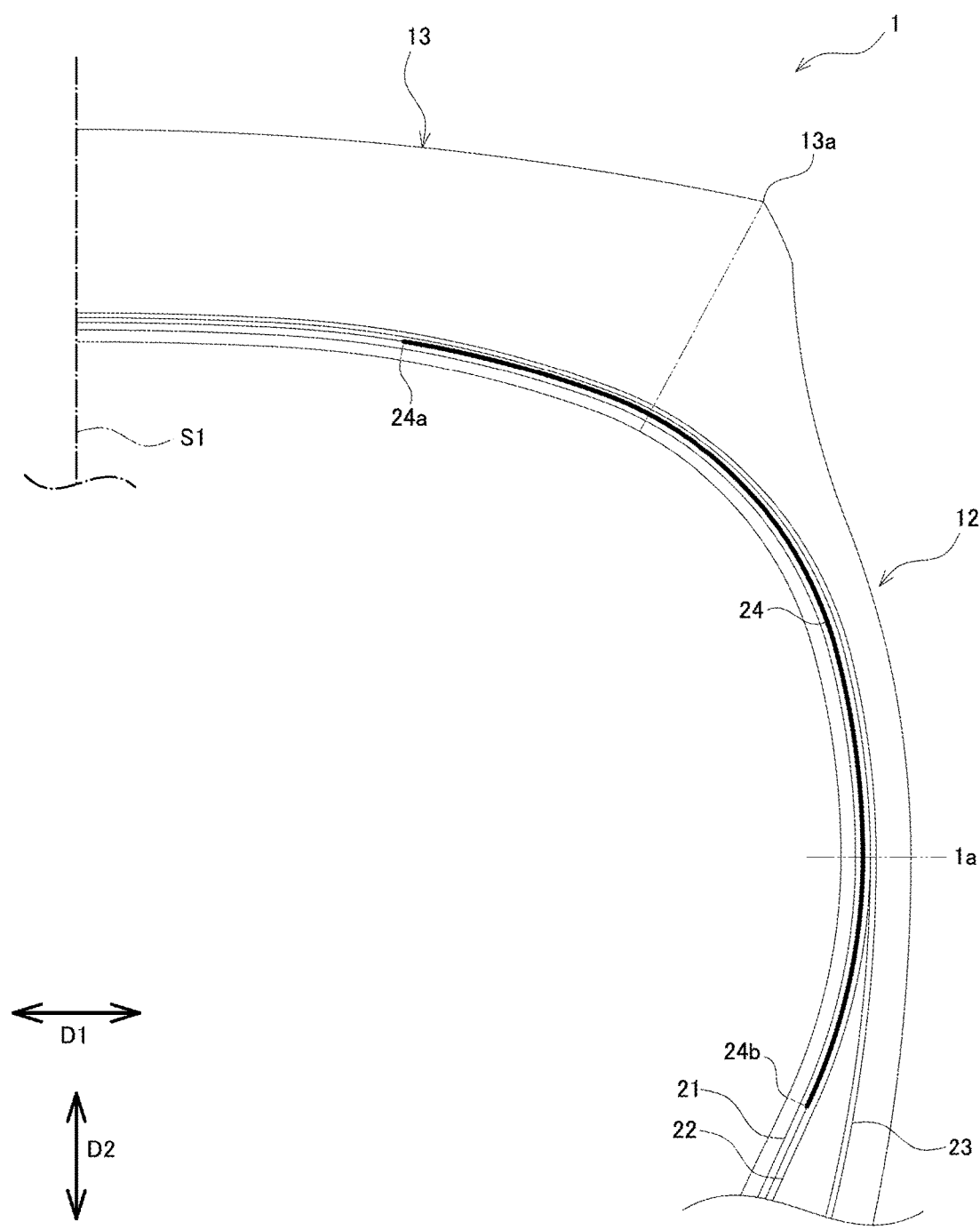
FIG. 5 is a cross-sectional view of the main part of the pneumatic tire according to the present embodiment on the tire meridian plane.

Note that FIG. 4 illustrates a state immediately after the rubber tape 24 is pasted, and the outer side surfaces 242b and the inner side surfaces 242c are flat surfaces. However, after the first carcass ply 21 is deformed into a toroidal shape, and after such vulcanization molding, the outer side surfaces 242b and the inner side surfaces 242c are sometimes curved. However, in either of the above-described cases, the rubber tape 24 has: the central portion 241 pasted to the outside of the joint portion 14a and extending with a constant thickness along the tire circumferential direction D3; and the tapered portions 242 individually extending from both ends 241a and 241a of the central portion 241 in the tire circumferential direction D3 along the tire circumferential direction D3 while reducing the thickness, and having tip ends 242a with an angle θ of 45 degrees or less.

The angle θ of the tip ends 242a of the tapered portions 242 is 45 degrees of less. Preferably, the angle θ of the tip ends 242a is 30 degrees or less. When the angle θ exceeds 45 degrees, the tip ends 242a may generate projections on the tire surface. Note that the angle θ of the tip ends 242a is an angle made by the outer side surfaces 242b and the inner side surfaces 242c. Further, the angle θ of the tip ends 242a is an angle on a cross section perpendicular to the inner side surfaces 242c and along the tire circumferential direction D3.

A width w14 of the joint portion 14a in the tire circumferential direction D3 is 2.0 to 6.0 mm. Note that, when the width w14 of the joint portion 14a is 6.0 mm or more, the recesses on the tire surface become conspicuous.

A width w24 of the rubber tape 24 in the tire circumferential direction D3 is 5 to 30 mm. A width w241 of the central portion 241 in the tire circumferential direction D3 is set to be larger than the width w14 of the joint portion 14a. However, considering variations and the like at the time of pasting the first carcass ply 21 and the rubber tapes 24 to the molding drum 9, preferably, the width w241 of the central portion 241 is larger by 2.0 mm or more than the width w14 of the joint portion 14a.

The rubber tapes 24 are composed of the same rubber as the topping rubber 212. Specifically, the rubber tapes 24 are composed of: a rubber composition containing, as a rubber component, a blend of 5 to 20% of trans-polyisoprene and 95 to 80% of natural rubber and/or diene-based synthetic rubber; or a rubber composition containing, as a rubber component, a blend of 5 to 35% of trans-polyoctenemer and 95 to 65% of natural rubber and/or diene-based synthetic rubber.

A thickness t241 of the central portion 241 of the rubber tape 24 is larger than a diameter d of the carcass cords 211. The thickness t241 of the central portion 241 is, for example, 1.0 to 1.5 mm. The diameter d of the carcass cords 211 is, for example, 0.6 to 1.0 mm. Further, a thickness t21 of the first carcass ply 21 including the carcass cords 211 and the topping rubber 212 is, for example, 1.2 to 1.3 mm.

The rubber tape 24 may cover the entire joint portion 14a, but preferably, covers at least a portion of the joint portion 14a, the portion being located on each of the sidewalls 12. Thus, the recess can be suppressed from being generated on the particularly conspicuous sidewall 12. Specifically, as illustrated in FIG. 5, preferably, the rubber tape 24 is disposed in at least a range between a point 24a separate by 30 mm toward the tire equatorial plane S1 from a point with which a perpendicular line drawn from a ground contact end 13a toward the tire inner surface intersects and a point 24b separate by 30 mm from a tire maximum width position 1a inward in the tire radial direction D2.

Incidentally, like the first carcass ply 21, each of the second carcass ply 22 and the third carcass ply 23 also includes: a plurality of carcass cords 211 arrayed in parallel to one another in the direction substantially perpendicular to the tire circumferential direction D3; and topping rubber 212 that coats the carcass cords 211. Further, the carcass 14 has: a joint portion 14a in which ends of the second carcass ply 22 in the tire circumferential direction D3 are overlapped with each other; and a joint portion 14a in which ends of the third carcass ply 23 in the tire circumferential direction D3 are overlapped with each other. Therefore, though a detailed description will be omitted, the carcass 14 may have rubber tapes 24 which individually cover the joint portion 14a of the second carcass ply 22 and the joint portion 14a of the third carcass ply 23. Note that, preferably, positions of the joint portions 14a of the first carcass ply 21, the second carcass ply 22 and the third carcass ply 23 are differentiated from one another in the tire circumferential direction D3.

As described above, a method for manufacturing the pneumatic tire 1 according to the present embodiment is a method for manufacturing the pneumatic tire 1, the method including:

the step of winding the carcass plies 21, 22 and 23 around the molding drum 9 to mold the carcass 14, wherein the carcass 14 has the joint portions 14a in each of which the ends of each of the carcass plies 21, 22 and 23 in the tire circumferential direction D3 are overlapped with each other, the method further includes the step of pasting the rubber tapes 24 each of which covers at least a part of the joint portion 14a after winding the carcass plies 21, 22 and 23, and each of the rubber tapes 24 has: the central portion 241 pasted to the outside of the joint portion 14a and extending with a constant thickness along the tire circumferential direction D3; and the tapered portions 242 individually extending from both ends 241a and 241a of the central portion 241 in the tire circumferential direction D3 along the tire circumferential direction D3 while reducing the thickness of each thereof, and having the tip ends 242a with an angle θ of 45 degrees or less.

With this configuration, the rubber tapes 24 are pasted to the joint portions 14a of the carcass plies 21, 22 and 23 so as to cover the same, whereby the recesses generated in the joint portions 14a can be filled with the rubber tapes 24. Therefore, the recesses can be suppressed from being generated on the tire surface by the joint portions 14a. Further, each of the rubber tapes 24 has the tapered portions 242, whereby, on the ends (tip ends 242a) of the rubber tape 24 in the tire circumferential direction D3, the projections can be suppressed from being generated on the tire surface.

Further, in the method for manufacturing the pneumatic tire 1 according to the present embodiment, in terms of configuration, each of the carcass plies 21, 22 and 23 has the plurality of carcass cords 211 arrayed in parallel to one another and the topping rubber 212 that coats the carcass cords 211, and the thickness t241 of the central portion 241 is larger than the diameter d of the carcass cords 211.

With this configuration, the recesses generated in the joint portions 14a can be appropriately filled with the rubber tapes 24.

Further, in the method for manufacturing the pneumatic tire 1 according to the present embodiment, in terms of configuration, the tapered portions 242 extend from both ends 241a and 241a of the central portion 241 in the tire circumferential direction D3 along the tire circumferential direction D3 while reducing the thickness in a constant ratio.

With this configuration, on the ends of each of the rubber tapes 24 in the tire circumferential direction D3, the projection can be appropriately suppressed from being generated on the tire surface. Further, cross sections of the tapered portions 242 are formed into a triangular shape, whereby it becomes easy to mold the rubber tape 24.

Further, the pneumatic tire 1 according to the present embodiment includes the carcass 14 that reaches the beads 11 from the tread 13 through the sidewalls 12, wherein the carcass 14 has: the joint portions 14a in each of which the ends of each of the carcass plies 21, 22 and 23 in the tire circumferential direction D3 are overlapped with each other; and the rubber tapes 24 each of which covers at least a part of the joint portion 14a, and each of the rubber tapes 24 has: the central portion 241 pasted to the outside of the joint portion 14a and extending with a constant thickness along the tire circumferential direction D3; and the tapered portions 242 individually extending from both ends 241a and 241a of the central portion 241 in the tire circumferential direction D3 along the circumferential direction D3 while reducing the thickness of each thereof, and having the tip ends 242a with an angle θ of 45 degrees or less.

With this configuration, the rubber tapes 24 are pasted to the joint portions 14a of the carcass plies 21, 22 and 23 so as to cover the same, whereby the recesses generated in the joint portions 14a can be filled with the rubber tapes 24. Therefore, the recesses can be suppressed from being generated on the tire surface by the joint portions 14a. Further, each of the rubber tapes 24 has the tapered portions 242, whereby, on the ends (tip ends 242a) of the rubber tape 24 in the tire circumferential direction D3, the projections can be suppressed from being generated on the tire surface.

Note that the respective dimension values, the positional relationships, the dimensional relationships and the like, which are mentioned above, are measured in a non-load normal state where the pneumatic tire 1 is mounted on a normal rim and filled with a normal internal pressure. For example, the tire maximum width position 1a is a position in the tire radial direction D2, where dimensions of the pneumatic tire 1 in the tire axis direction D1, the dimensions excluding those of structures such as patterns and characters which protrude from the outer surface of the sidewalls 12, are maximized when the pneumatic tire 1 is in such a non-load state where the pneumatic tire 1 is mounted on the normal rim and filled with the normal internal pressure. In a standard system including a standard on which the pneumatic tire 1 is based, the normal rim is a rim defined for each pneumatic tire 1 by the standard and is, for example, a standard rim in the case of the Japan Automobile Tyre Manufacturers Association (JATMA), or "Measuring Rim" in the case of the Tire and Rim Association, Inc. (TRA) and the European Tyre and Rim Technical Organization (ETRTO).

Further, in the standard system including the standard on which the pneumatic tire 1 is based, the normal internal pressure is an air pressure defined for each pneumatic tire 1 by the standard and is, for example, a maximum air pressure in the case of JATMA, a maximum value described in Table "TIRE LOAD LIMITS AT VARIOUS COLD INFLATION PRESSURES" in the case of TRA, and "INFLATION PRESSURE" in the case of ETRTO.

Note that the pneumatic tire 1 is not limited to the configuration of the embodiment described above and is not limited to the operation and effect described above. Moreover, as a matter of course, the pneumatic tire 1 can be modified in various ways within the scope without departing from the spirit of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

(1) In the method for manufacturing the pneumatic tire 1 according to the above-described embodiment and in the pneumatic tire 1 according thereto, in terms of configuration, each of the carcass plies 21, 22 and 23 has the plurality of carcass cords 211 arrayed in parallel to one another and the topping rubber 212 that coats the carcass cords 211, and the thickness t241 of the central portion 241 is larger than the diameter d of the carcass cords 211. However, the method for manufacturing the pneumatic tire 1 and the pneumatic tire 1 are not limited to such a configuration. For example, even if the thickness t241 of the central portion 241 is the diameter d of the carcass cords 211 or less, the recess on the tire surface due to the joint portion 14a can be made less conspicuous.

(2) Further, in the method for manufacturing the pneumatic tire 1 according to the above-described embodiment and in the pneumatic tire 1 according thereto, in terms of configuration, the tapered portions 242 extend from both ends 241a and 241a of the central portion 241 in the tire circumferential direction D3 along the tire circumferential direction D3 while reducing the thickness in a constant ratio. However, the method for manufacturing the pneumatic tire 1 and the pneumatic tire 1 are not limited to such a configuration. The tapered portions 242 do not necessarily have to extend from both ends 241a and 241a of the central portion 241 in the tire circumferential direction D3 along the tire circumferential direction D3 while reducing the thickness in a constant ratio, and as illustrated in FIG. 6 for example, the outer side surfaces 242b may be recessed surfaces which protrude inward, and the inner side surfaces 242c may be flat surfaces. With this configuration, the angle θ of the tip ends 242a of the tapered portions 242 can be reduced, and therefore, the projections can be effectively suppressed from being generated on the tire surface at the ends (tip ends 242a) of the rubber tape 24 in the tire circumferential direction D3. Note that the angle θ of the tip ends 242a of the tapered portions 242 illustrated in FIG. 6 is an angle made by tangential lines of the outer side surfaces 242b and the inner side surfaces 242c on the tip ends 242a.

(3) Further, in the tapered portions 242, as illustrated in FIG. 7 for example, the outer side surfaces 242b may be protruding surfaces which protrude outward, and the inner side surfaces 242c may be flat surfaces. With this configuration, air can be suppressed from entering between the tapered portions 242 and the second carcass ply 22 to be disposed on the outside thereof. Note that the angle θ of the tip ends 242a of the tapered portions 242 illustrated in FIG. 7 is an angle made by tangential lines of the outer side surfaces 242b and the inner side surfaces 242c on the tip ends 242a.

(4) In the method for manufacturing the pneumatic tire 1 according to the above-described embodiment and in the pneumatic tire 1 according thereto, the joint portion 14a of the first carcass ply 21 is provided on only one spot thereof in the tire circumferential direction D3. However, the method for manufacturing the pneumatic tire 1 and the pneumatic tire 1 are not limited to such a configuration. For example, ends of a plurality of the first carcass plies 21 in the tire circumferential direction D3 may be overlapped with each other, and a plurality of the joint portions 14a may be provided on a plurality of spots thereof in the tire circumferential direction D3. In that case, a plurality of the rubber tapes 24 may be individually pasted to the respective joint portions 14a so as to cover the same.

(5) In the method for manufacturing the pneumatic tire 1 according to the above-described embodiment and in the pneumatic tire 1 according thereto, the carcass 14 is formed of three carcass plies 21, 22 and 23. However, the method for manufacturing the pneumatic tire 1 and the pneumatic tire 1 are not limited to such a configuration. For example, the carcass 14 may be formed of only the first carcass ply 21 and the third carcass ply 23 without providing the second carcass ply 22.

What is claimed is:

1. A method for manufacturing a pneumatic tire, the method comprising:
   a step of winding carcass plies around a molding drum to mold a carcass,
   wherein the carcass has a joint portion in which ends of each of the carcass plies in a tire circumferential direction are overlapped with each other,
   the method further comprises a step of pasting a rubber tape that covers at least a part of the joint portion after winding the carcass ply, and
   the rubber tape has: a central portion pasted to an outside of the joint portion and extending with a constant thickness along the tire circumferential direction; and tapered portions individually extending from both ends of the central portion in the tire circumferential direction along the tire circumferential direction while reducing a thickness of each of the tapered portions, and having tip ends with an angle of 45 degrees or less, wherein a thickness of each of the tapered portions is same as the thickness of the central portion at the connection with the central portion, and decreases from the thickness of the central portion as it approaches the tip end.

2. The method for manufacturing a pneumatic tire according to claim 1, wherein each of the carcass plies has a plurality of carcass cords arrayed in parallel to one another and topping rubber that coats the carcass cords, and a thickness of the central portion is larger than a diameter of the carcass cords.

3. The method for manufacturing a pneumatic tire according to claim 1, wherein the tapered portions extend from both ends of the central portion in the tire circumferential direction along the tire circumferential direction while reducing the thickness in a constant ratio.

4. The method for manufacturing a pneumatic tire according to claim 1, wherein inner side surfaces of the tapered portions in a tire radial direction extend continuously with an inner side surface of the central portion in the tire radial direction.

5. The method for manufacturing a pneumatic tire according to claim 1, wherein the central portion completely covers the joint portion in the tire circumferential direction.

6. The method for manufacturing a pneumatic tire according to claim 1, wherein a width of the central portion in the tire circumferential direction is larger by 2.0 mm or more than a width of the joint portion in the tire circumferential direction.

7. The method for manufacturing a pneumatic tire according to claim 1, wherein the outer side surfaces of the tapered portions are recessed surfaces which protrude inward, and the inner side surfaces of the tapered portions are flat surfaces.

8. The method for manufacturing a pneumatic tire according to claim 1, wherein the outer side surfaces of the tapered portions are protruding surfaces which protrude outward, and the inner side surfaces of the tapered portions are flat surfaces.

\* \* \* \* \*